No. 689,996. Patented Dec. 31, 1901.
T. L. & T. J. STURTEVANT.
MOTOR VEHICLE.
(Application filed Oct. 24, 1901.)
(No Model.) 4 Sheets—Sheet 1.
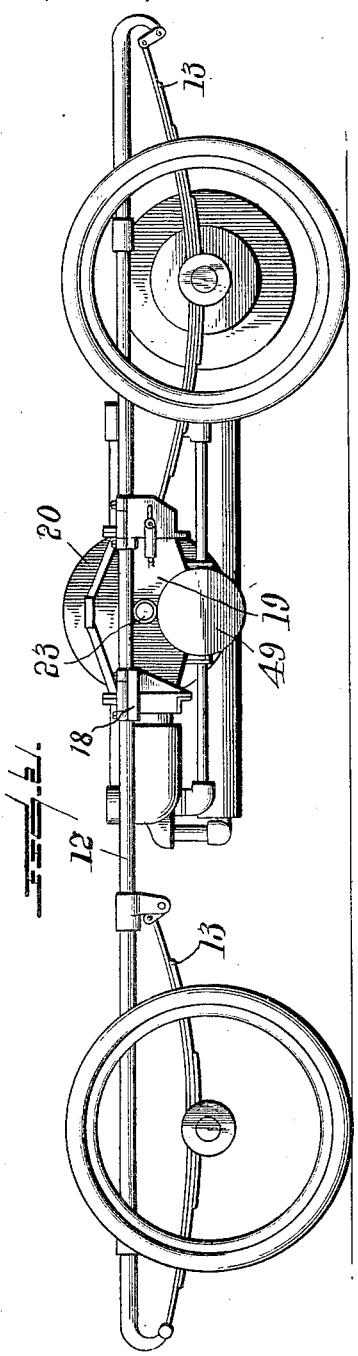
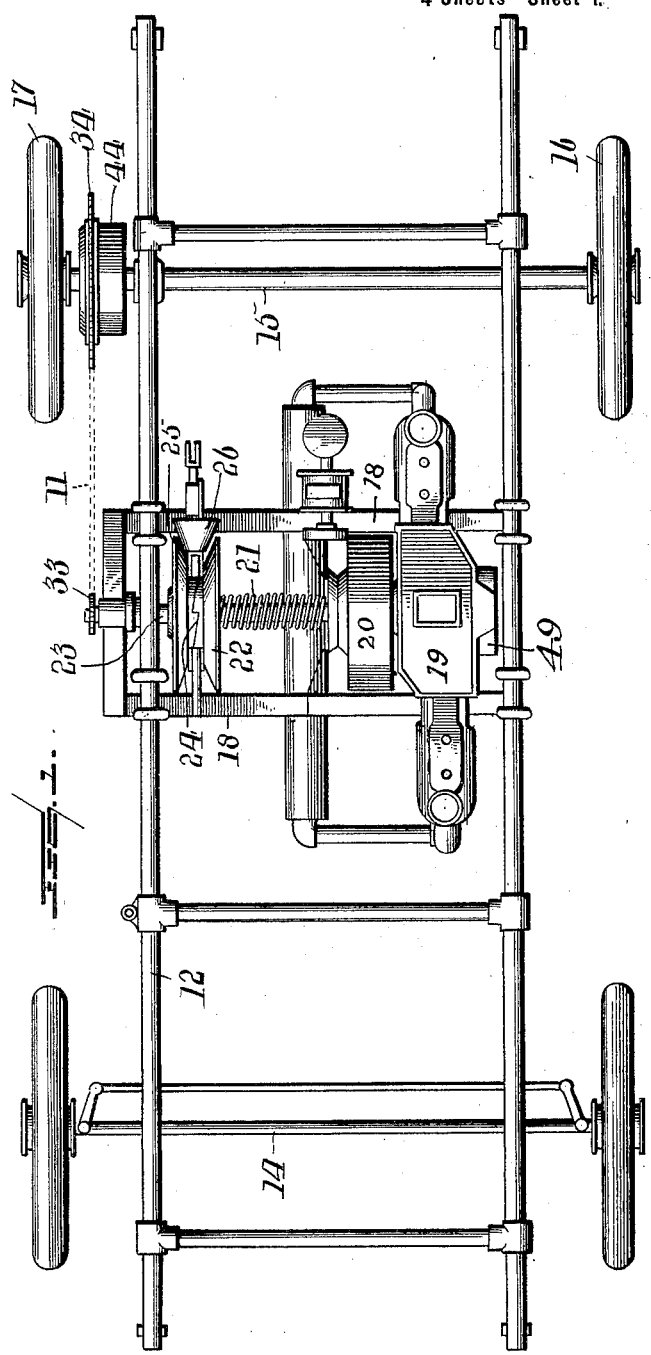
Witnesses:
Wm. F. Doyle.
C. M. Sweeney.
Inventors:
Thomas L. Sturtevant,
Thomas J. Sturtevant,
By Henry Hales,
Attorney.

No. 689,996. Patented Dec. 31, 1901.
T. L. & T. J. STURTEVANT.
MOTOR VEHICLE.
(Application filed Oct. 24, 1901.)
(No Model.) 4 Sheets—Sheet 2.
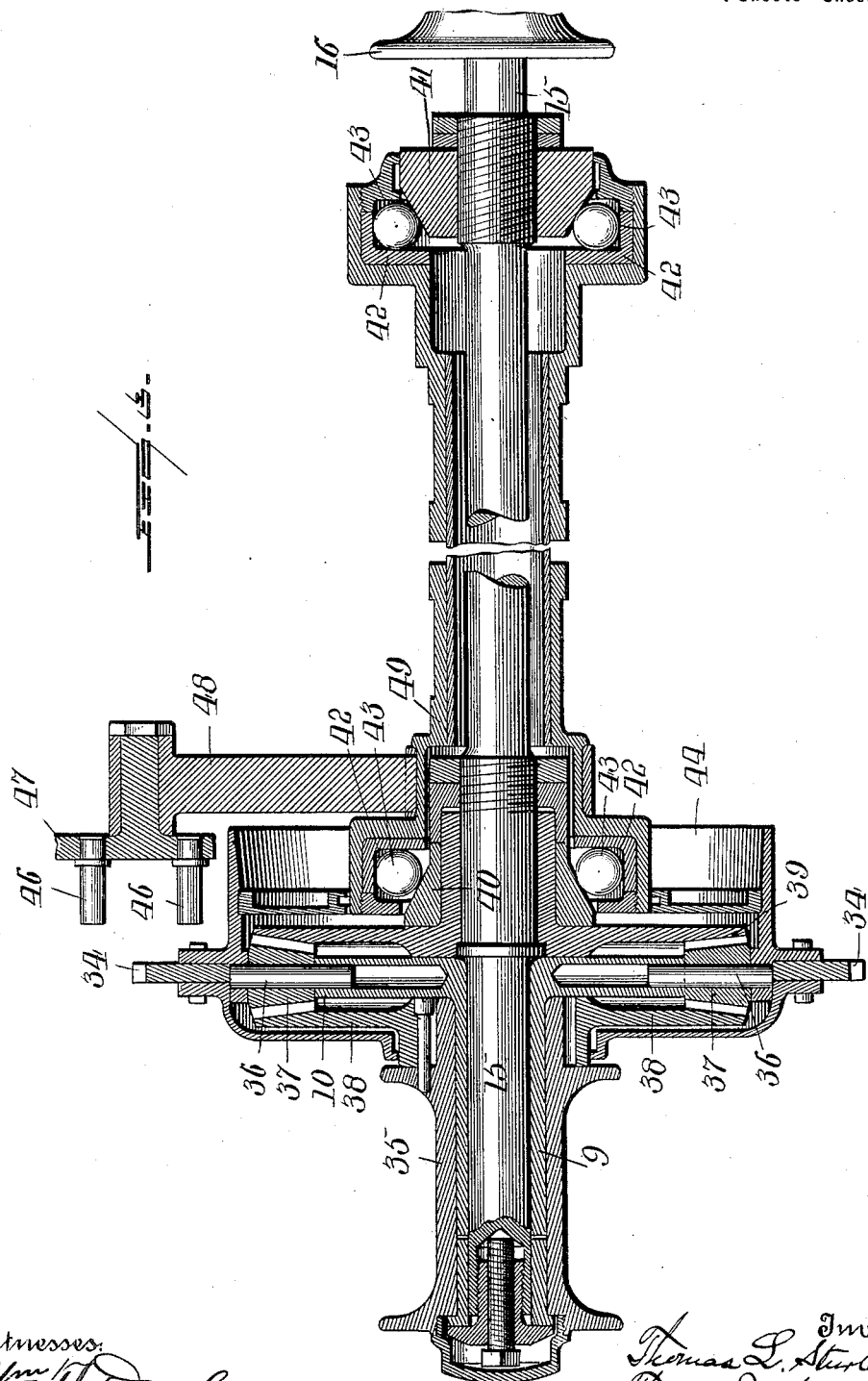
Witnesses:
Wm. F. Doyle.
C. M. Sweeney.
Inventors:
Thomas L. Sturtevant,
Thomas J. Sturtevant,
by Henry Calver,
Attorney.

No. 689,996. Patented Dec. 31, 1901.
T. L. & T. J. STURTEVANT.
MOTOR VEHICLE.
(Application filed Oct. 24, 1901.)
(No Model.) 4 Sheets—Sheet 3.
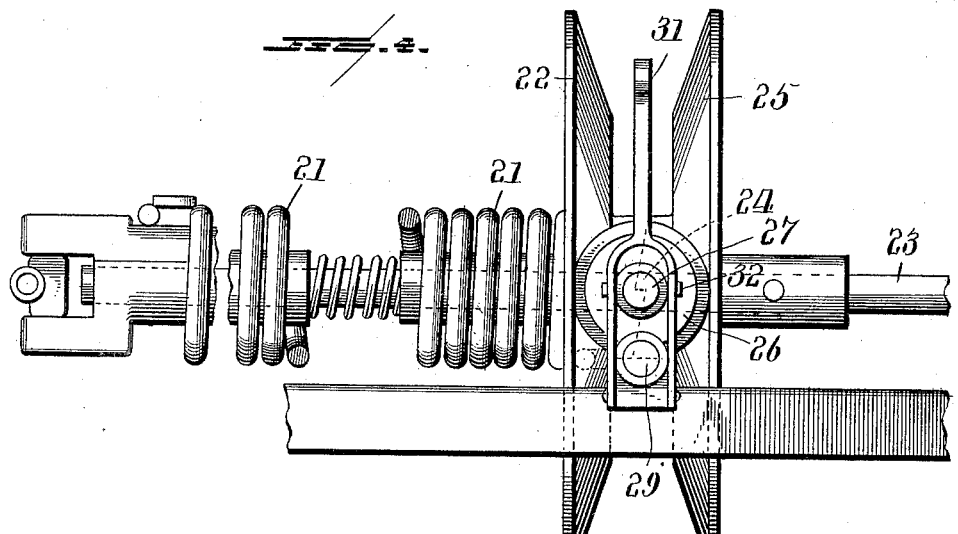
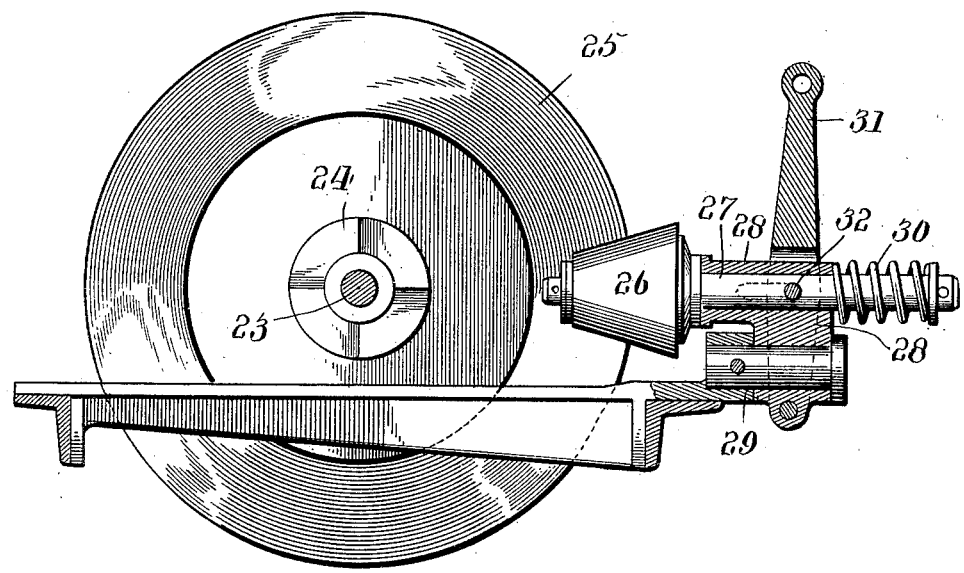

No. 689,996. Patented Dec. 31, 1901.
T. L. & T. J. STURTEVANT.
MOTOR VEHICLE.
(Application filed Oct. 24, 1901.)
(No Model.)  4 Sheets—Sheet 4.
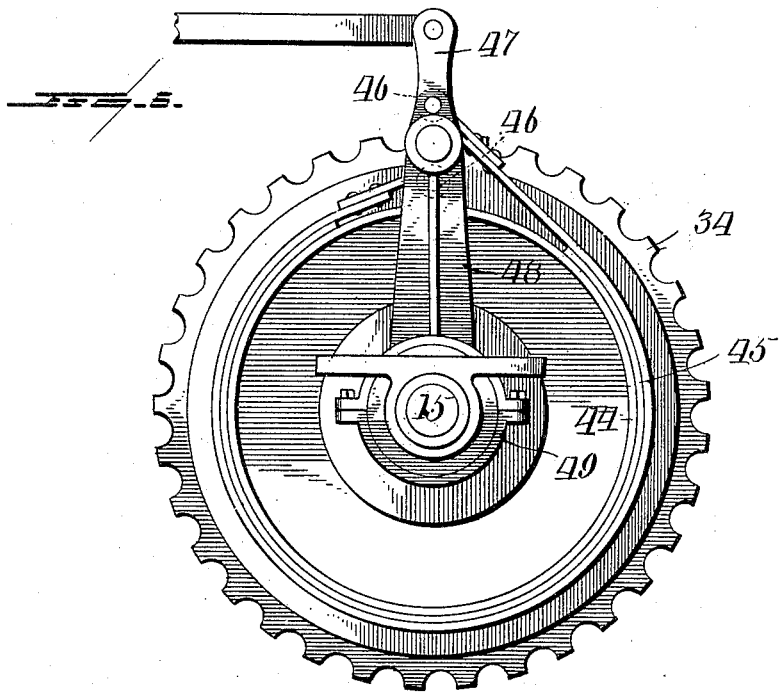
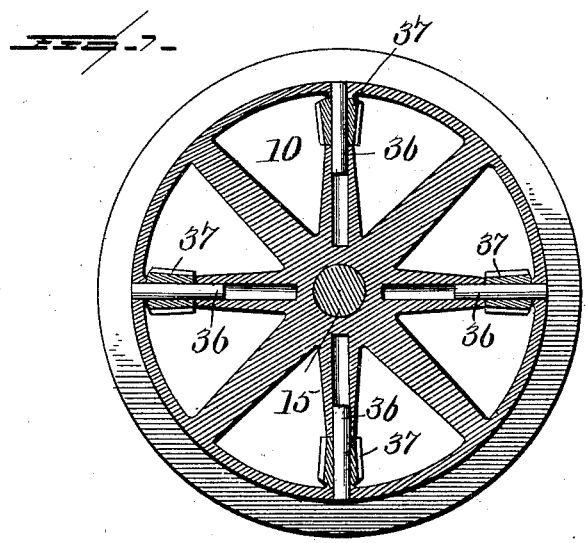
Witnesses:
Wm. F. Doyle.
C. M. Sweeney.
Inventors:
Thomas L. Sturtevant,
Thomas J. Sturtevant,
By
Attorney.

UNITED STATES PATENT OFFICE.

THOMAS L. STURTEVANT, OF QUINCY, AND THOMAS J. STURTEVANT, OF NEWTON CENTER, MASSACHUSETTS.

MOTOR-VEHICLE.

SPECIFICATION forming part of Letters Patent No. 689,996, dated December 31, 1901.

Application filed October 24, 1901. Serial No. 79,758. (No model.)

*To all whom it may concern:*

Be it known that we, THOMAS L. STURTEVANT, residing at Quincy, in the county of Norfolk, and THOMAS J. STURTEVANT, residing at Newton Center, in the county of Middlesex, State of Massachusetts, citizens of the United States, have invented certain new and useful Improvements in Motor-Vehicles, of which the following is a specification, reference being had therein to the accompanying drawings.

This invention relates to motor-vehicles, and is in some of its features an improvement upon the invention covered by our Patent No. 675,425, dated June 24, 1901, the object of the present invention being to provide such a construction and arrangement of parts as will conduce to a comparatively simple driving mechanism conveniently accessible for adjustment or repairs and which will at the same time afford the greatest possible strength and durability consistent with comparatively small weight.

In the accompanying drawings, Figure 1 is a plan view of the running-gear of the vehicle with our improved driving mechanism applied thereto, and Fig. 2 is a side view of the same. Fig. 3 is a sectional view, partly broken out, of the rear axle of the vehicle, showing the mechanism for transmitting power to the driving-wheel of the vehicle. Figs. 4 and 5 are detail views of the reversing mechanism, and Fig. 6 is a detail view of the brake device. Fig. 7 is a detail view of part of the differential gearing.

Referring to the drawings, 12 denotes the running-gear frame of the vehicle, which will preferably be of metallic tubular construction, but which may be built in any approved manner, said running-gear frame being preferably mounted on springs 13, suitably supported by the front axle 14 and rear axle 15. In the construction herein shown the front axle is the steering-axle and the rear axle the driving-axle, one of the rear driving-wheels 16 being keyed or otherwise directly secured to said rear axle, while the other rear driving-wheel 17, while normally rotating with the axle, is loosely mounted on said axle, so as to be adapted to rotate independently thereof, and is connected with the said axle by suitable differential gearing, which permits said wheel 17 to turn more or less on the axle, as is necessary in turning corners.

The driving mechanism of the vehicle is mounted on a suitable transversely-disposed frame 18, attached to the vehicle-frame 12 in such a manner that it may be readily disconnected from said frame 12, if desired, simply by taking out a few bolts. Upon this frame 18 is suitably mounted the engine 19, which will preferably be a gas-engine, constructed as more fully described in our application, Serial No. 78,083, filed October 9, 1901, and the shaft of which is arranged transversely of the vehicle and provided with a balance-wheel 20, with which the power-transmitting shaft has a centrifugal-clutch connection, which is or may be of the construction fully described in our said Patent No. 675,425. The power-transmitting shaft, which is arranged transversely of the vehicle, will preferably comprise a transmitting-spring 21, which enables the power of the engine to be yieldingly applied to the driving mechanism, thereby avoiding wrenching or straining of the parts and jerking of the carriage when the motor is suddenly coupled to the driving mechanism of the vehicle, as fully set forth in our said patent.

The power-transmitting spring 21 preferably has a ratchet connection at one end with the automatic centrifugal clutch referred to, as in the construction shown in our said patent, and is connected at its opposite end to a driving-disk 22, mounted on the transverse shaft 23 so as to rotate independently of said shaft, the hub of said disk being provided with a grab-clutch 24, connecting said hub with the hub of a reversing-disk 25, which is keyed or otherwise secured to said shaft. Between the disks 22 and 25 is arranged an idler bevel-wheel or cone 26, mounted upon an endwise-movable stud or shaft 27, having its bearings in a bracket 28, which is in turn mounted on a pivot 29 so that the said bracket may swing sidewise on the said pin 29 to allow the cone 26 to adjust itself to the driving-disks 22 and 25 when circumstances may require. The bevel-wheel or cone 26 is normally held so as not to be in contact with the disk 25 by the spring 30, surrounding the shaft 27, and the said bevel-wheel or cone is adapted to be forced inward between the disks 24 and 25 when desired by means of a reversing-lever 31, suitably pivoted to the bracket 28 and provided with a pin 32, which engages the stud or shaft 27, on which the said bevel-wheel or cone 26 is mounted. The lever 31 can be operated to force the bevel-wheel or cone inward between the disks 22 and 25 against the stress of the spring 30, and thereby force the said disk 22 away from the disk 25 to disconnect the grab-clutch 24, so that the power in such a case, instead of being transmitted directly to the driving-disk 25 through the said grab-clutch, will be transmitted to the said disk 25 from the disk 22 through the bevel-wheel or cone 26, thereby reversing the direction of rotation of the said driving-disk 25 and of the shaft 23, to which the driving sprocket-wheel 33 is suitably attached.

The sprocket-wheel 33 will be connected by a chain 11 (denoted by dotted lines in Fig. 1) in the usual manner with a sprocket-wheel 34, rigidly connected with a rotating spider 10, having a sleeve 9 loosely mounted on the axle 15, and which spider comprises stub-shafts 36, on which are mounted bevel-pinions 37, meshing, respectively, with a bevel-gear 38, rigid with the hub 35 of the rear driving-wheel 17, and with a second bevel-gear 39, fixed to the axle 15 to impart motion to said axle and to the wheel 16, mounted thereon. The hub 35 of the wheel 17 is mounted to rotate on the sleeve 9. The rotating spider 10, carrying the bevel-pinions 37, will normally cause the said axle 15 to rotate coincidently with the hub 35 of the wheel 17; but said bevel-pinions will permit the hub of the said wheel 17 to move faster or slower than its axle, as is necessary in turning corners with the vehicle.

By locating the differential gearing, consisting of the bevel-pinions 37 and bevel-gears 38 and 39, near one end of the axle 15 we are enabled to employ an undivided axle, so that there is less liability of disarrangement or breakage of the parts than where a two-part axle connected by differential gearing is used, as is the more common construction. Furthermore, by locating the differential gearing near one end of the driving-axle the parts are conveniently accessible, so that they may be readily gotten at or removed for adjustment or repairs.

The rear axle is provided with ball-bearings comprising the fixed cone 40, the adjustable cone 41, (which is adapted to take up wear for both ball-bearings,) the boxes 42, and the balls 43, interposed between said boxes and cones. The sprocket-wheel 34 is provided with a brake-drum 44, surrounded by a friction-band 45, the opposite ends of which are attached to two separated pins 46 on a lever 47, having its fulcrum in a bracket 48, firmly clamped to a casing 49, surrounding the rear axle 15, and which casing contains suitable supports for the springs 13, which support the rear portion of the vehicle-frame. By manipulating the lever 47 the brake-band can be tightened when desired in slowing up or stopping the vehicle.

By arranging the engine-shaft transversely of the vehicle to be driven we are enabled to locate the engine near one side of the vehicle, where it is conveniently accessible for adjustment or repairs without getting under the vehicle, and we are also enabled to transmit the power of the engine to the driving-sprocket without requiring such couplings as were necessary in the construction shown by our patent hereinbefore referred to, and in which the engine-shaft was arranged lengthwise of the vehicle. Also by arranging the differential gearing for the rear axle near one end thereof and preferably outside of the running-gear frame of the vehicle we locate the parts of this mechanism in such a manner that they are conveniently accessible for adjustment, removal, or repairs.

Our improved vehicle works upon the same principle as that shown and described in our patent hereinbefore referred to in that the balance-wheel or fly-wheel of the engine is connected with the power-transmitting mechanism through an automatic centrifugal clutch in such a manner that when the load or duty on the engine becomes too great the engine will be automatically uncoupled from the driving mechanism, so that it can speed up and store up power in the balance-wheel or fly-wheel, and when the speed of the engine reaches a certain point the engine-shaft will be automatically coupled with the transmitting mechanism in the same manner as is the mechanism described in our patent aforesaid. When the power-transmitting spring is uncoupled from the engine-shaft, it is retained under tension by a ratchet mechanism similar to that described in our said patent, so that the power stored up in the spring will not be lost when the spring is uncoupled from the engine-shaft.

As heretofore stated, the location of the engine close to one side of the vehicle and between the front and rear wheels thereof facilitates access to the engine without getting under the vehicle, and for convenience of access to the engine mechanism from the outside of the vehicle the casing of the engine is preferably provided with a removable side cover 49, which can be taken off to permit of easy access to the engine mechanism.

Having thus described our invention, we claim and desire to secure by Letters Patent—

1. In a motor-vehicle, a driving-engine arranged close to one side of the vehicle between the front and rear wheels thereof and having its shaft transverse to the vehicle said engine having a casing comprising a removable side cover, combined with a power-transmitting shaft suitably connected with the engine-shaft and also arranged transversely of the vehicle, driving-wheels for the said vehicle, and mechanism connecting the said driving-wheels with the said power-transmitting shaft.

2. In a motor-vehicle, the combination with suitable driving-wheels for said vehicle, of an engine located close to one side of the vehicle and having its shaft arranged transversely of the vehicle, a power-transmitting mechanism comprising a transverse power-transmitting spring, and a chain-and-sprocket mechanism between the said power-transmitting mechanism and the said driving-wheels.

3. In a motor-vehicle, the combination with an engine having its shaft arranged transversely of the vehicle, and provided with a fly-wheel, of a power-transmitting shaft also extending transversely of the vehicle, an automatic centrifugal clutch connecting said power-transmitting shaft with the said fly-wheel, a reversing mechanism on said power-transmitting shaft, driving-wheels for said vehicle, and mechanism connecting the said power-transmitting shaft to the said driving-wheels.

4. In a motor-vehicle, the combination with an engine having its shaft arranged transversely of the vehicle and provided with a fly-wheel, of a power-transmitting shaft also extending transversely of the vehicle, and provided with a sprocket-wheel, an automatic centrifugal clutch connecting said power-transmitting shaft with the said fly-wheel, a reversing mechanism on said power-transmitting shaft, driving-wheels for said vehicle, a sprocket-wheel for one of said driving-wheels, and a chain connecting the said sprocket-wheels.

5. In a motor-vehicle, the combination with an engine having its shaft arranged transversely of the vehicle, and provided with a fly-wheel, of a power-transmitting shaft also extending transversely of the vehicle, an automatic centrifugal clutch connecting said power-transmitting shaft with the said fly-wheel, a reversing mechanism on said power-transmitting shaft, driving-wheels for said vehicle, and a chain-and-sprocket mechanism connecting the said power-transmitting shaft to the said driving-wheels.

6. In a motor-vehicle, the combination with a driving mechanism and a power-transmitting shaft arranged transversely of the vehicle, of a reversing mechanism comprising two disks having a clutch connection, and a bevel-wheel normally out of engagement with one of said disks, but arranged to be moved between said disks so as to force them apart and disconnect said clutch, so that when said clutch is disconnected the power will be transmitted from the first driving-disk to the second driving-disk through the said bevel-wheel.

7. In a motor-vehicle, the combination with a driving-engine, a power-transmitting shaft and a centrifugal-clutch connection between the engine-shaft and power-transmitting shaft, of a reversing mechanism comprising two disks one of which is movable independently of the power-transmitting shaft and the other of which is secured to said shaft, said disks having a clutch connection with said shaft, and a bevel-wheel normally out of engagement with one of said disks, but arranged to be moved between said disks so as to force them apart and disconnect said clutch, so that when said clutch is disconnected the power will be transmitted from the first driving-disk to the second driving-disk through the said bevel-wheel.

8. In a motor-vehicle, the combination with an engine having its shaft arranged transversely of the said vehicle, of a power-transmitting shaft also arranged transversely of the vehicle and comprising a power-transmitting spring, a centrifugal clutch connecting said power-transmitting shaft with the said engine, and a reversing-gear and driving-sprocket all on said transversely-arranged power-transmitting shaft.

9. In a motor-vehicle, a rear axle provided with driving-wheels one of which is secured to said axle and the other of which is loosely mounted to rotate on said axle, a differential gearing located near one end of said axle and connected respectively with said axle and said loosely-mounted driving-wheel, ball-bearings for said axle located near the opposite ends thereof and comprising an adjustable cone adapted for taking up wear of both ball-bearings.

10. The combination in a motor-vehicle, of a motor placed near one side of the vehicle between the front and rear axles thereof, giving convenient access to the engine parts from the side of the carriage without interposition of the wheel parts, said motor having its shaft transversely placed across the carriage, and said shaft or its extensions carrying an automatic centrifugal clutch, and a spring power transmitting and storing device forming part of the connections between said motor and the driving-gear of the vehicle.

11. The combination in a motor-vehicle, of a motor located close to one side of the carriage, substantially as shown, and between the front and rear axles, and a power-transmitting shaft arranged transverse of the carriage-frame, said shaft carrying an automatic centrifugal clutch, a spring power-transmitting device and a driving-gear or chain-sprocket.

12. In a motor-vehicle, an engine carried close to one side of said vehicle, with its driving-shaft running athwart the vehicle, and carrying a clutch, a spring power-transmitting device, a reversing mechanism, and a driving-gear or sprocket.

13. In a motor-vehicle, the combination with a transverse driving or power-transmitting shaft, of a power storing and transmitting spring, a chain-driving sprocket, and a reversing-gearing all on said transverse shaft.

14. In a motor-vehicle, an engine placed close to one side of the vehicle-frame, substantially as shown, and between the wheel-axles thereof, the casing of said engine having a removable cover placed near to the outside of the vehicle for easy access to the engine mechanism, substantially as shown and described.

15. In a motor-vehicle, the combination of a cross-frame a side-placed engine, a transverse shaft carrying the driving and reversing mechanism, and a side-driven rear axle geared near one end to the said transverse shaft, and with one wheel-hub carrying the differential or compensating gearing, the sprocket-chain-driving wheel and a brake-drum.

In testimony whereof we affix our signatures in presence of two witnesses.

THOMAS L. STURTEVANT.
  THOMAS J. STURTEVANT.

Witnesses:
 W. H. ELLIS,
 LLOYD MAKEPEACE.